United States Patent [19]

Gall

[11] Patent Number: 4,531,688
[45] Date of Patent: Jul. 30, 1985

[54] COILABLE DEVICE

[75] Inventor: John C. Gall, Chicago, Ill.

[73] Assignee: Sears, Roebuck & Co., Chicago, Ill.

[21] Appl. No.: 531,294

[22] Filed: Sep. 12, 1983

[51] Int. Cl.³ .............................................. B65H 75/48
[52] U.S. Cl. ................................. 242/107.3; 242/107.5
[58] Field of Search ................................ 242/107–107.7

[56] References Cited

U.S. PATENT DOCUMENTS

| | | | |
|---|---|---|---|
| 469,934 | 3/1892 | Chauncey | 242/107.5 |
| 1,043,092 | 11/1912 | Goodwin | 242/107.2 |
| 1,763,811 | 6/1930 | Occhiuzzo | 242/107.6 X |
| 2,679,659 | 6/1954 | Grupp | 16/198 |
| 2,896,912 | 7/1959 | Faugier et al. | 254/159 |
| 2,904,282 | 9/1959 | Zelnick | 242/107.3 X |
| 3,007,653 | 11/1961 | Becker | 242/107.5 |
| 3,033,488 | 5/1962 | Weber | 242/107.5 |
| 3,054,573 | 9/1962 | Spencer | 242/107.5 |
| 3,062,478 | 11/1962 | Adachi | 242/107 |
| 3,065,925 | 11/1962 | Appleton | 242/107.5 |
| 3,121,957 | 2/1964 | Brown | 33/137 |
| 3,123,052 | 3/1964 | Marshall | 119/124 |
| 3,214,836 | 11/1965 | West | 33/138 |
| 3,246,363 | 4/1966 | Rogas et al. | 16/78 |
| 3,305,103 | 2/1967 | Hilstrom | 214/1.5 |
| 3,318,550 | 5/1967 | Quenot | 242/107.3 |
| 3,332,638 | 7/1967 | Jessup et al. | 242/107.3 |
| 3,337,155 | 8/1967 | Binding | 242/107 |
| 3,381,916 | 5/1968 | Edgell | 242/107.5 |
| 3,402,900 | 9/1968 | VanNoord | 242/107.5 |
| 3,435,529 | 4/1969 | Quenot | 33/138 |
| 3,437,281 | 4/1969 | Quenot | 242/84.8 |
| 3,443,316 | 5/1969 | Edgell | 33/138 |
| 3,450,367 | 6/1969 | Edgell | 242/107.2 |
| 3,462,096 | 8/1969 | Bailey et al. | 242/107.7 |
| 3,463,416 | 8/1969 | Quenot | 242/84.8 |
| 3,473,751 | 10/1969 | Quenot | 242/67.2 |
| 3,482,798 | 12/1969 | Kawaguchi | 242/107.3 |
| 3,493,190 | 2/1970 | Quenot | 242/84.8 |
| 3,502,280 | 3/1970 | Jessup et al. | 242/107.3 |
| 3,689,004 | 9/1972 | Brown et al. | 242/107 R |
| 3,716,201 | 2/1973 | West | 242/107 |
| 3,731,389 | 5/1973 | King | 33/189 |
| 3,744,733 | 7/1973 | Bennett | 242/107.3 |
| 3,812,588 | 5/1974 | Bennett | 33/138 |
| 3,816,925 | 6/1974 | Hogan et al. | 33/138 |
| 3,889,897 | 6/1975 | Zelderen | 242/107.3 |
| 3,905,114 | 9/1975 | Rutty | 33/138 |
| 3,942,738 | 3/1976 | Rutty | 242/107.2 |
| 4,067,513 | 1/1978 | Rutty et al. | 242/107.3 |
| 4,077,128 | 3/1978 | Stoutenberg | 33/138 |
| 4,131,244 | 12/1978 | Quenot | 242/107.2 |
| 4,183,476 | 1/1980 | Fohl | 242/107 |
| 4,189,107 | 2/1980 | Quenot et al. | 242/84.8 |
| 4,194,703 | 3/1980 | Roe | 242/107.3 X |
| 4,215,829 | 8/1980 | Boyllin | 242/107 |
| 4,253,617 | 3/1981 | Nakagawa et al. | 242/55 |
| 4,270,708 | 6/1981 | Vonk | 242/107.3 |
| 4,288,923 | 9/1981 | Duda | 33/138 |
| 4,290,564 | 9/1981 | Karlsson | 242/107 |
| 4,293,058 | 10/1981 | Burton | 188/65.1 |
| 4,437,624 | 3/1984 | Rosenberg | 242/107.3 |

Primary Examiner—Johm M. Jillions
Attorney, Agent, or Firm—Wood, Dalton, Phillips, Mason & Rowe

[57] ABSTRACT

A coilable member, such as a measuring tape, is replaceably supported within a device for extension and recoiling. A separable casing defines an aperture through which a coilable member can be extracted and retracted, and has an interior portion defining a bearing surface for supporting for rotation a first reel adapted to retain a spring secured to the reel. The first reel rotatably supports a second reel adapted to support the coilable member secured thereto and extending through the aperture defined by the casing. The second reel is supported in the casing by the first reel for relative axial movement with respect to the first reel. Braking means, which can include an annular member having teeth which engage at least one of the reels, rotates therewith in the casing substantially freely in one direction, while causing retardation of the rotation of the reel in the opposite direction through frictional engagement with the side of the casing. The device can further include a rotatable member accessible for rotation through an aperture in the casing for tensioning a spring retained by the first reel.

15 Claims, 4 Drawing Figures

COILABLE DEVICE

TECHNICAL FIELD

This invention relates generally to reel-type devices wherein a reel or drum is provided with torsional spring means which stores energy as a coiled object is extracted, and thereby provides power for retraction of the object. The invention is herein described as applied to a measuring tape, but the invention is adaptable to other types of reel devices.

BACKGROUND OF THE INVENTION

Retractable measuring tapes and other devices for extracting and recoiling a coilable member have been on the market for many years. Commonly, these devices have evolved into a basic design which has a number of problems. The basic design is typically shown by U.S. Pat. No. 3,318,550 which includes a slotted center post affixed to the side of the housing with one end of a clock type torsion spring mounted in the post slot. A drum or cylinder is provided for rotation about the center post with the torsion spring within the drum and a measuring tape supported about the periphery of the drum. In the common design, the outer end of the torsion spring is usually attached to the inner end of the tape and may pass through a slot in the drum. The outer end of the tape is commonly provided with a hook member which is used to hold the end of the tape during measuring, and upon retraction, abuts the tape opening to prevent the end of the tape from being retracted into the housing.

In order to assure complete retraction, the torsion spring is pre-tensioned, that is, the spring is placed in tension even upon the tape being in a fully retracted condition within the housing. The accepted approach to pre-tensioning the torsion spring is to physically rotate the reel or drum supporting the spring and tape about the center post before the housing is assembled. The device may include a stop mechanism to retain the pre-tensioning of the spring, as described in U.S. Pat. No. 3,007,653.

As the tape is extended from the housing in the basic design, the tape turns the drum or cylinder and directly or indirectly winds the torsion spring to store energy therein needed for retraction. As a clock type torsion spring has a progressive spring rate, the force needed for tape extraction increases as the tape is withdrawn and thus provides maximum acceleration to the retracting tape when the tape is released from being extended. The continuous, although decreasing, retracting force causes considerable linear and rotational momentum to the retracting tape.

In the tape design heretofore described, breakage of the hook, either by misuse or through impact at the housing, which commonly occurs if the lineal and rotational momentum imparted to the tape upon retraction is not dissipated before the hook reaches the housing, allows the tape end to enter the housing resulting in elimination of the pretension of the spring and/or causing damage thereto. Repair of the tape, and frequently of the spring, must be made by opening the housing and handling the tape and spring to connect a new tape which must be manually wound and the spring pre-tensioned. Repair in this manner can be dangerous to the novice. Generally the damaged device is discarded rather than repaired.

DISCLOSURE OF THE INVENTION

Accordingly, an object of the present invention is to provide a new design for a device for supporting a coilable member for extension and recoiling which minimizes or eliminates the hazard and damage frequently encountered in the devices presently in use, particularly upon uncontrolled retraction of the member into the housing of the device.

Another object of the present invention is to provide a device for supporting a coilable member for extension and recoiling in which a coiled member can be installed as a unit into the device as a replacement for a worn or damaged coilable member.

A further object of the present invention is to provide a reel within the device which encloses a torsion spring for safety and as a barrier against foreign matter.

Another object is to provide a device for supporting a coilable member for extension and recoiling which utilizes an automatic braking system for controlling the speed at which the coilable member is retracted, while allowing unimpeded extraction of the coilable member from the device.

A still further object is to provide a device which includes an inertia activated automatic braking system requiring very little increase, if any, in the size of the device.

An additional object of the present invention is to provide a device for supporting a coilable member for extension and recoiling which includes a convenient and safe means for adjusting the spring pre-tension after the device has been assembled.

These and other objects and advantages of this invention will become apparent from the following description when the same is considered in connection with the accompanying drawings.

SUMMARY OF THE INVENTION

The foregoing objects and advantages are attained by the present invention in which a device for supporting a replaceable coilable member for extension and recoiling is provided comprising a separable casing having opposing walls, a first reel rotatably supported in the casing and adapted to retain a spring secured to the reel, a second reel supported in the casing by the first reel for rotation therewith and for relative axial movement with respect thereto and adapted to support a coilable member secured thereto and extending through an aperture in the casing, and braking means positioned within the casing and cooperating with at least one of the reels for retarding the rotation of the reels upon rotation in at least one direction. The casing defines an aperture through which a coilable member can be extracted and retracted, and has an interior portion of one of its opposing walls defining a bearing surface adapted to support the first reel for rotation.

In the present invention, at least one of the reels has engaging means for engaging the other of the reels for rotation therewith. Preferably the engaging means comprises tab means extending from at least the one reel and cooperatively engaging with portions of the other reel. More preferably, the tab means comprises arcuate tabs extending coaxially from the reel, while the portions of the other reel define arcuate slots adapted to receive the tabs and permit axial movment of one reel with respect to the other. The braking means preferably comprises an annular member rotatably mounted within the casing, and more preferably having at least one surface frictionally engageable with the interior surface of at least one wall of the casing. Most preferably, the annular member includes a plurality of teeth adapted to engage at least one of the reels for rotation and retardation therewith.

It is also preferred that the device of the present invention include a rotatable member positioned within the casing and having pawl means for engaging a recess included in a central cavity defined by one of the opposing walls of the casing so as to permit the rotation of the rotatable member within the casing. The rotatable member preferably has means for retaining one end of a spring retained by the first reel, with the rotatable member being accessible for rotation through an aperture defined in one wall of the casing, whereby a spring retained by the rotatable member will be tensioned upon rotation of the member in the first direction.

BRIEF DESCRIPTION OF THE PREFERRED EMBODIMENT

Figure 1:
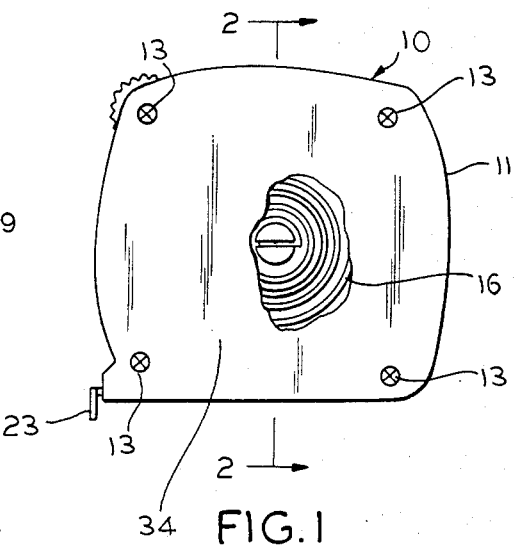
FIG. 1 is a side view of a measuring tape assembly in accordance with the present invention with the casing partially broken away to show the interior of the assembly.
Figure 2:
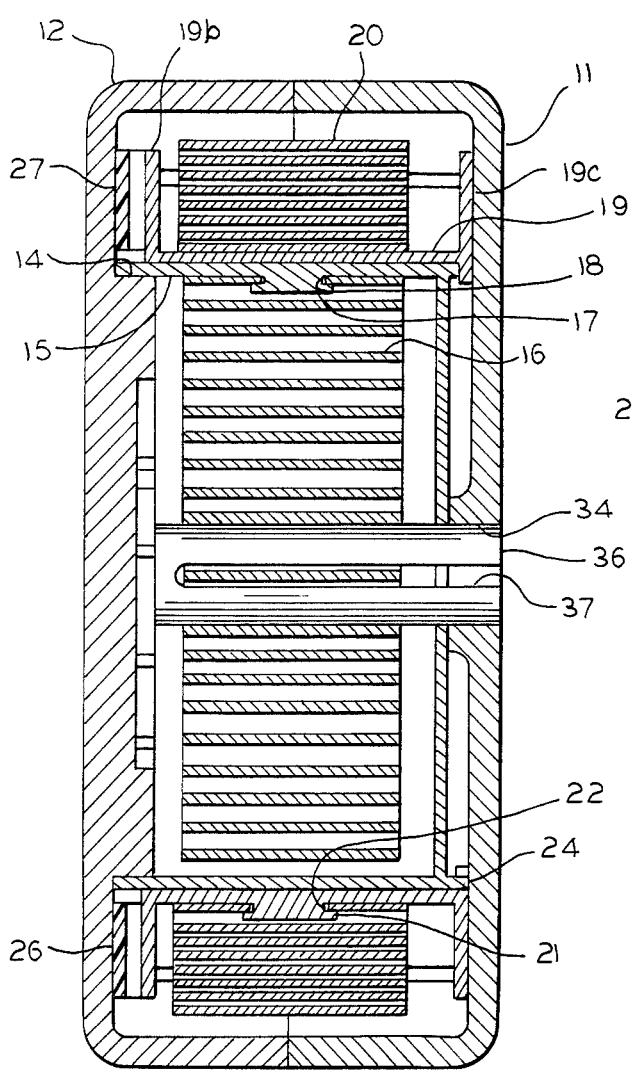
FIG. 2 is a sectional view of the tape assembly of FIG. 1, taken along line 2—2 of FIG. 1.

Referring to the drawings, the reference numeral 10 indicates a reel-type device, in the form of a measuring tape, in accordance with the present invention. Measuring tape 10 comprises a separable casing formed of opposing dish-shaped walls 11 and 12, which are held together by fasteners, such as screws 13, preferably along the marginal portion of the casing.

Wall 12 includes an interior portion defining an annular bearing surface 14 adapted to support a first reel 15 for rotation. Retained within reel 15 is a torsion spring 16 which is secured to the interior surface of reel 15, for example by attachment of spring 16 to a headed post 17, as shown, the spring having a key hole slot 18, for this purpose.

A second reel 19 is supported within the casing by the cylindrical outer surface of the first reel 15. Reel 19 is U-shaped in cross section, formed by cylindrical bottom wall 19a and a pair of annular side walls 19b, 19c extending outwardly therefrom. Reel 19 supports a coiled member, such as tape 20, as shown. Tape 20 at its inner marginal end is secured to reel 19, for example, by means of a headed post 21 of reel 19 onto which the tape is secured, for example, by utilizing a key hole slot 22, although as in the case of the attachment of spring 16 to reel 15, other attachment means known to the art can be used. Reel 19 and the coilable member, such as tape 20, secured thereto and coiled about bottom wall 19a and within walls 19b and 19c constitute a unit which may be readily placed into device 10 as a replacement for a worn coilable member, as will be hereinafter described. The opposite, outside end of tape 20 can extend through an aperture formed in the casing (as common in the art), the end of tape 20 being affixed to a hook 23 residing outside of the casing, as shown in FIG. 1.

Reel 15 includes arcuate tabs 24 which extend coaxially from the reel and constitute tab means and serve as engaging means as hereinafter described. Tabs 24 of reel 15 cooperatively engage with portions of reel 19 which define arcuate slots 25 adapted to receive the tabs 24 and permit axial movement of the two reels with respect to each other while maintaining their engagement. Tabs 24 constitute tab means which serve as engaging means for engaging reel 19 for rotation therewith while permitting relative axial movement with respect thereto.

Included within device 10 is an annular braking member 26 which acts as braking means in axial cooperation with reel 19. Member 26 is rotatably mounted within the casing formed by walls 11 and 12 and rotates with reel 19 in a manner which will be hereinafter described, while optionally being spaced from reel 15. At least one surface 27 of member 26 can include a frictional braking material adapted to retard rotation of member 26 upon surface 27 being forced against the interior surface of wall 12. Alternatively, surface 27 of member 26 can be the surface of the member which will frictionally engage the interior surface of wall 12 upon member 26 being forced against that latter surface.

Member 26 includes a plurality of teeth 28 which are adapted to engage reel 19 for rotation therewith and for retarding the rotation of reel 19. Additionally, reel 19 includes a plurality of teeth 29 formed on the exterior of annular wall 19b, which are adapted to engage with the plurality of teeth 28 of annular member 26 for rotation and retardation of rotation therewith. The pluralities of teeth 28 and 29 include radially aligned mating surfaces 30 and opposed mating faces 31 angled thereto.

Reel 19 and annular braking member 26 are positioned within the separable casing with space between each and walls 11 and 12 such that a small amount of axial movement is permitted between reel 19, braking member 26 and the walls 11 and 12 of the casing. Thus, when reel 19 is rotated in the counterclockwise direction, rotational force from reel 19 is imparted to member 26 through the radially aligned mating faces 30, thereby rotating member 26, while providing substantially zero force between the members in an axial direction. Rotation of reel 19 in a counterclockwise direction which may result from tape 20 being extracted from device 10, therefore, will not force annular member 26 and its surface 27 against wall 12.

However, upon rotation of reel 19 in the opposite direction, rotational force will be transmitted from reel 19 to annular member 26 through angled mating faces 31 of the pluralities of teeth 28 and 29, such that the inertial resistance of member 26 will react with angled faces 31 resulting in a force component in an axial direction away from reel 19. This force component causes member 26 and reel 19 to move away from each other to the extent of the spacing permitted by walls 11 and 12 and dependent upon the speed of rotation of reel 19. The forcing apart of reel 19 and member 26 in an axial direction pushes surface 27 of memver 26 into contact with the interior surface of wall 12 resulting in frictional engagement therebetween and retardation of the rotation of annular member 26, which retardation is transmitted to reel 19. The rotation and retardation of these members will be described in greater detail upon consideration of the operation of the device.

Figure 3:
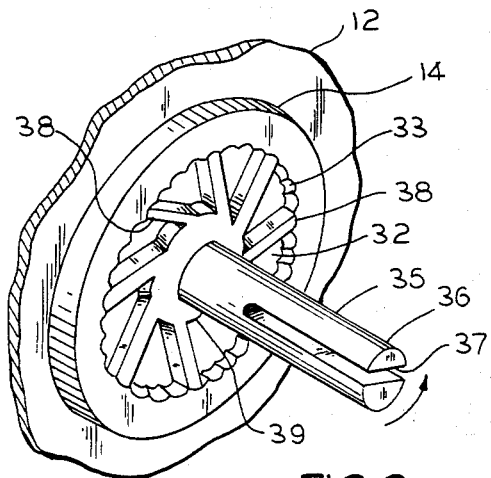
FIG. 3 is an enlarged perspective view of the center shaft-rotatable member and a fragmentary portion of one wall of the casing.
Figure 4:
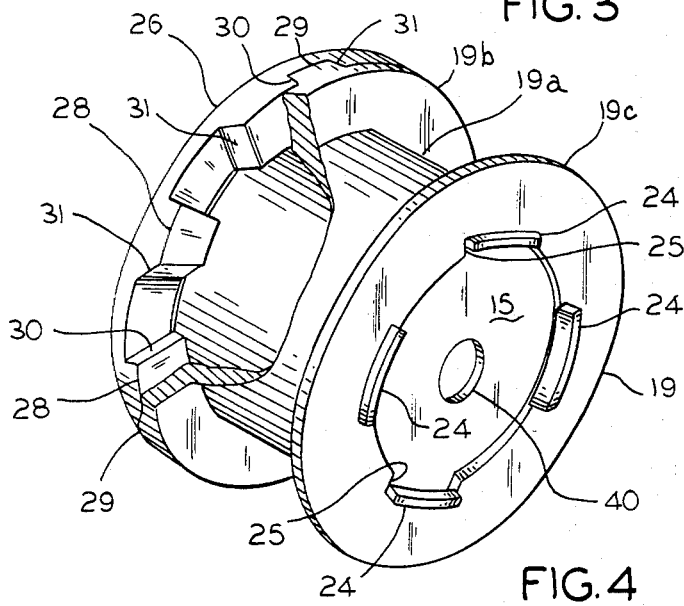
FIG. 4 is an enlarged perspective view of a pair of reels and a rotatable braking member in accordance with the present invention, with one reel broken away to illustrate details of the latter.

Referring to FIG. 3, wall 12 of the separable casing includes a raised interior portion having as its outer peripheral surface bearing surface 14, heretofore described, and defining a central cavity 32 further defined by a plurality of recesses 33 about the periphery of the cavity. Wall 11 of the separable casing defines an aperture 34 which is substantially aligned with the center of the central cavity 32. Positioned within the casing and within central cavity 32 is a rotatable member 35 which includes a center shaft 36 having a slot 37, which can be positioned along the diameter or a chord of the shaft, and a plurality of pawl members 38 which radiate from a hub 39 secured to or integral with shaft 36. Recesses 33 are radially aligned within cavity 32 and are adapted to receive and retain an end portion of pawl members 38 upon engagement therewith. In the embodiment shown in the drawing, radially aligned recesses 33 are adapted to receive and retain the free ends of pawl members 38. Pawl members 38 have a length including the radius of the hub 39 which is greater than the radial distance of the recesses 33 from the axis of shaft 36. The rotation of rotatable member 35 is permitted in only one direction, clockwise in the embodiment shown, with the free ends of pawls 38 alternately entering into and exiting recesses 33; while rotation in the opposite direction, i.e. counterclockwise, is prevented due to the pawl members 38 being angled toward the counterclockwise with respect to radii of the axis of rotation of rotatable member 35 with their free ends residing in recesses of the plurality of recesses 33.

In the embodiment shown in the drawing, aperture 34 of wall 11 is slightly larger than shaft 36 and wall 11 can be formed with a thicker or reinforced section adjacent to or forming the aperture so as to support the free end of shaft 36. In addition, reel 15 includes a central aperture 40 in its circular wall surrounding and supported for rotation about shaft 36. Reel 15 may include a second, similar circular wall (not shown) positioned adjacent the raised interior portion of wall 12. However, the second circular wall is not necessary, and may hamper replacement of torsion spring 16, if replacement should become necesssary.

Assembly of the device of the present invention is readily accomplished in the following manner. With the walls 11 and 12 of the separable casing separated, rotatable member 35 is positioned with pawl members 38 within central cavity 32 with the free ends of the pawl members residing in recesses of the plurality of recesses 33. Reel 15, to which one end of spring 16 is secured, is placed over shaft 36 with the free end of spring 16 being placed within slot 37 of shaft 36, the positioning continued until reel 15 is placed against bearing surface 14 of wall 12 and aperture 40 of reel 15 is positioned about shaft 36. Braking member 26 can then be slipped over reel 15 and placed so that its annular interior surface 27 is against wall 12. Reel 19, to which one end of tape 20 is secured and about which tape 20 is coiled can next be placed about reel 15 and positioned so that its teeth 29 mesh with teeth 28 of braking member 26, and the tabs 24 of reel 15 reside within arcuate slots 25 of the reel 19. Reel 19 and tape 20 can be provided as a replaceable unit for easily and safely replacing the tape by removing the original or previously installed reel and tape unit from the device and placing the new unit into the device in place thereof in the manner heretofore described. The free end of tape 20 to which hook 23 is secured is positioned to extend through the aperture portion of wall 12 heretofore described. A suitable manual lock (not shown) may be installed. Wall 11 of the separable casing can now be positioned about shaft 36 and in contact with the free edge of wall 12, and held thereto by the placement and fastening of screws 13.

Torsion spring 16 can be adjusted to provide pretension, that is, to be tensioned so as to retain the coilable member within the casing when the member is not extended, by inserting a screwdriver or other tool into slot 37 of shaft 36, for which aperture 34 in wall 11 has been provided, and rotating the shaft and pawl members 38 in a clockwise direction. As an end of spring 16 has been placed in slot 37 of shaft 36, rotation of the shaft will cause coiling of the spring to provide the pre-tension. Tensioning of the spring in this manner will result in a coiling force to the coilable member in the counterclockwise direction causing the free end and hook 23 to be pulled toward the casing formed by walls 11 and 12.

With spring 16 pre-tensioned, device 10 operates in the following manner. Extraction of the free end of tape 20 from the device causes reel 19 to rotate clockwise due to the opposing end of the tape being secured to the reel. As the teeth 29 of reel 19 are engaged with the teeth 28 of braking member 26 with the rotational forces being transmitted through their radially aligned faces 30, braking member 26 is rotated without substantial force being applied between the braking member 26 and the annular surface of wall 12. Rotation of reel 19 in a clockwise direction further causes reel 15 to rotate in the same direction due to arcuate tabs 24 of reel 15 being engaged within arcuate slots 25 of reel 19. Rotation of reel 15 in this manner causes spring 16 to be tensioned as one end is held in a fixed position within slot 37 of shaft 36 while the other end is secured to reel 15. The tension force imparted to spring 16 increases as tape 20 is extracted.

Upon release of tape 20 from being extracted, or upon release of a locking member (not shown) which may hold the tape in an extracted condition, the tension of spring 16 will provide a release of the stored spring energy tending to rapidly accelerate the retraction of the tape into the device, the force being transmitted from reel 15 through tabs 24 to reel 19 and hence to the tape. However, upon rotation and acceleration of reel 19 in the counterclockwise direction, rotational force is transmitted from its teeth 29 through the teeth 28 of braking member 26 through their mating angled faces 31, forcing the braking member 26 and reel 19 apart from each other, axially, resulting in braking member 26 bein forced into frictional engagement with the interior annular surface of wall 12. This frictional engagement provides a retarding force to the rotation of the braking member, and hence to reel 19 in the clockwise direction which opposes the acceleration of the rotational force caused by spring 16. The retarding force increases with the acceleration of the retraction of the tape caused by spring 16 and decreases as the speed of rotation of reel 19 decreases. Reel 19 will also frictionally engage the interior surface of wall 11 as the reel and member 26 are forced apart during rapid retraction of the coilable member.

In the manner of operation described above, minimal frictional engagement occurs between the housing and the reels or braking member during extraction of coilable member 20 from device 10, facilitating extraction of the coilable member; whereas upon retraction of the coilable member into device 10, the device automatically, through intertia activated automatic braking means provides for retardation of the reels and automatically controlled retraction of the coilable member.

Various changes coming within the spirit of the invention may suggest themselves to those skilled in the art; hence, the invention is not limited to the specific embodiments shown and described or uses mentioned, but the same is intended to be merely exemplary, the scope of the invention being limited only by the appended claims.

I claim:

1. A device for supporting a replaceable coilable member for extension and recoiling, comprising:

a separable casing having opposing walls, said casing having an aperture through which a coilable member can be extracted and retracted, said casing having an interior portion adapted to support a first reel for rotation;

a first reel rotatably supported in said casing on said interior portion, said first reel retaining a spring having one end secured thereto, said first reel being adapted to rotatably support a second reel within said casing; and a second reel supported in said casing by said first reel for rotation with and axial movement relative to said first reel during recoiling of said coilable member, said second reel supporting said coilable member within said casing and being removably mounted within said casing for replacement of said second reel and coilable member as a unit with another second reel and coilable member, said coilable member having one end secured to said second reel and the other end extending through said aperture in said casing;

said first and second reels having positive engagement means for rotation of said reels together, said positive engagement means permitting said relative axial movement between said first and second reels.

2. The device as defined in claim 1, wherein said positive engagement means comprises tab means extending from one of said reels and cooperatively engaging with portions of the other of said reels.

3. The device as defined in claim 2, wherein said tab means comprises arcuate tabs extending coaxially from said one reel, and said portions of the other of said reels are arcuate slots adapted to receive said arcuate tabs.

4. The device as defined in claim 1, wherein said second reel comprises a cylindrical bottom wall and a pair of side walls extending outwardly from said bottom wall, said second reel having said coilable member coiled within said side walls and about said bottom wall with an end portion thereof secured to said bottom wall, said second reel and coilable member being installed in said device as a replaceable unit about the periphery of said first reel.

5. A device for supporting a replaceable coilable member for extension and recoiling, comprising:

a separable casing having opposing walls, said casing having an aperture through which a coilable member can be extracted and retracted, said casing having an interior portion of one of said opposing walls adapted to support a first reel for rotation, said casing further having a central cavity including an interior recess, and said casing also having an aperture in one of said walls substantially aligned with said central cavity in said casing;

a first reel rotatably supported in said casing on said interior portion, said first reel retaining a spring having one end secured thereto, said first reel being adapted to rotatably support a second reel within said casing;

a second reel supported in said casing by said first reel for rotation with and axial movement relative to said first reel during recoiling of said coilable member, said second reel supporting said coilable member within said casing and being removably mounted within said casing for replacement of said second reel and coilable member as a unit with another second reel and coilable member, said coilable member having one end secured to said second reel and the other end extending through said aperture defined by said casing;

a rotatable member positioned within said casing and having pawl means for engaging said interior recess in said central cavity in said casing so as to operationally limit the rotation of said rotatable member within said casing to one direction, said rotatable member having means for retaining the other end of said spring retained by said first reel, and said rotatable member being accessible for rotation in said one direction through said aperture in said one of said casing walls;

whereby said spring retained by said rotatable member will be tensioned upon rotation of said rotatable member in said one direction.

6. The device as defined in claim 5, wherein said interior recess in said central cavity in said casing is radially aligned and is adapted to receive and retain a portion of said pawl means upon engagement therewith.

7. The device as defined in claim 5, wherein said central cavity in said casing includes a plurality of interior radially aligned recesses, and said pawl means comprises a plurality of pawl members having their free ends engagable in recesses of said plurality of recesses.

8. The device as defined in claim 7, wherein said pawl members, at least upon assembly in said cavity in said casing, having their free ends engaging recesses of said plurality of recesses, said pawl members being angled in a direction opposite to said one direction with respect to radii of the axis of rotation of said rotatable member, said rotatable member only being rotatable in said one direction after the free ends of said pawl members are engaging recesses of said plurality of recesses.

9. A device for supporting a replaceable coilable member for extension and recoiling, comprising:

a separable casing having opposing walls, said casing having an aperture through which a coilable member can be extracted and retracted, said casing having an interior portion adapted to support a first reel for rotation;

a first reel rotatably suppported in said casing on said interior portion, said first reel retaining a spring having one end secured thereto, said first reel being adapted to rotatably support a second reel within said casing;

a second reel supported in said casing by said first reel for rotation with and axial movement relative to said first reel during recoiling of said coilable member, said second reel supporting said coilable member within said casing, said coilable member having one end secured to said second reel and the other end extending through said aperture in said casing; and braking means positioned within said casing and axially cooperating with said second reel during recoiling of said coilable member such that said second reel causes relative axial movement between said second reel and said braking means for retarding rotation upon rotation in at least one direction;

said braking means comprising inertia activated automatic braking means.

10. The device as defined in claim 9, wherein said braking means comprises an annular member rotatably mounted within said casing.

11. The device as defined in claim 10, wherein a surface of said annular member is frictionally engagable with an interior surface of a wall of said casing.

12. The device as defined in claim 11, wherein said surface of said annular member includes frictional means adapted to retard rotation of said annular member, said frictional means being axially forced against said interior surface of said wall of said casing in response to relative axial movement between said second reel and said braking means.

13. The device as defined in claim 9, wherein said annular member includes a plurality of angular teeth adapted to engage a plurality of complementary angular teeth on said second reel for retarding rotation.

14. The device as defined in claim 13, wherein said plurality of complementary teeth of said second reel and said annular member include a first set of aligned mating faces and a second set of mating faces angled thereto, said second reel and said annular member being adapted to rotate together substantially freely in a first direction corresponding to extraction of said coilable member from said casing with said first set of aligned mating faces means imparting rotational forces of said second reel means to said annular member, said second set of angled mating faces intertially causing relative axial movement between said second reel and said annular member in response to rotation together in a second direction corresponding to the retraction of said coilable member into said casing, whereby said annular member is forced against and into frictional engagement with said interior surface of said wall of said casing to retard the rotation of said annular member and said second reel.

15. The device as defined in claim 14, wherein rotation of said second reel in said first direction further causes said second reel to frictionally engage the interior surface of the other of said walls of said casing to retard rotation of said second reel.

* * * * *